US007266399B2

(12) United States Patent
Sawamura

(10) Patent No.: US 7,266,399 B2
(45) Date of Patent: Sep. 4, 2007

(54) CLAMSHELL PORTABLE WIRELESS TERMINAL WITH AN UPPER HOUSING AND A LOWER HOUSING CONNECTED TO EACH OTHER THROUGH A HINGE WITH A BUILT-IN ANTENNA HOUSED IN A PROJECTION SECTION NEAR THE HINGE

(75) Inventor: Masatoshi Sawamura, Saitama (JP)

(73) Assignee: Sony Erisson Mobile Communication Japan, Inc., Tokyo (JP)

( * ) Notice: Subject to any disclaimer, the term of this patent is extended or adjusted under 35 U.S.C. 154(b) by 43 days.

(21) Appl. No.: 11/441,640

(22) Filed: May 26, 2006

(65) Prior Publication Data

US 2006/0217164 A1 Sep. 28, 2006

Related U.S. Application Data

(63) Continuation of application No. 10/485,224, filed as application No. PCT/JP03/07022 on Jun. 3, 2003, now Pat. No. 7,082,324.

(30) Foreign Application Priority Data

Jun. 3, 2002 (JP) ............................ 2002-161078
Aug. 19, 2002 (JP) ............................ 2002-237969

(51) Int. Cl.
*H04M 1/00* (2006.01)

(52) U.S. Cl. .............................. 455/575.3; 455/575.1; 455/575.5; 455/575.7

(58) Field of Classification Search .............. 455/575.3
See application file for complete search history.

(56) References Cited

U.S. PATENT DOCUMENTS 5,451,965 A 9/1995 Matsumoto
6,327,485 B1 12/2001 Waldron
6,782,273 B2 8/2004 Ono et al.
2002/0006809 A1 * 1/2002 Kubo et al. ................. 455/550

FOREIGN PATENT DOCUMENTS

| | | |
|---|---|---|
| JP | 2001-284934 | 10/2001 |
| JP | 2002-504768 | 2/2002 |
| JP | 2002-141987 | 5/2002 |
| WO | WO99 43041 | 8/1999 |
| WO | WO 02 03665 | 1/2002 |

* cited by examiner

*Primary Examiner*—Nick Corsaro
*Assistant Examiner*—Sayed T. Zewari
(74) *Attorney, Agent, or Firm*—Frommer Lawrence & Haug LLP; William S. Frommer

(57) ABSTRACT

A portable wireless terminal has a hinge section provided type antenna suitable for a clamshell type which can maintain spacing from a head of a human body and alleviate influence of a hand of a user. The clamshell type portable wireless terminal having an upper housing (10) and a lower housing (20) connected to each other through a hinge has a projection section (30) projecting outward near a hinge section of the lower housing (20). In addition, a built-in antenna is housed in the projection section (30). The built-in antenna has an antenna element (50) in a linear or plate shape. At least a part of the antenna element on an open end side is disposed at a position which is hardly to be covered by the hand or finger of the user when the user uses the terminal.

3 Claims, 18 Drawing Sheets

CLAMSHELL PORTABLE WIRELESS TERMINAL WITH AN UPPER HOUSING AND A LOWER HOUSING CONNECTED TO EACH OTHER THROUGH A HINGE WITH A BUILT-IN ANTENNA HOUSED IN A PROJECTION SECTION NEAR THE HINGE

This is a continuation of application Ser. No. 10/485,224, filed Jan. 30, 2004 now U.S. Pat. No. 7,082,324, which is a 371 of International Application PCT/JP03/07022 filed Jun. 3, 2003, which is entitled to a claim of priority to Japanese Applications 2002-161078 filed Jun. 3, 2002 and 2002-237969 filed Aug. 19, 2002, the entirety of which are incorporated herein by reference.

TECHNICAL FIELD

The present invention relates to a portable wireless terminal, and particularly, to a built-in antenna of a portable wireless terminal for use in communication between mobile units for example a mobile phone, and to the structure and arrangement of a sound emitting port of a speaker which generates ringtone.

BACKGROUND ART

Portable wireless terminals for communication between mobile units such as a mobile phone (in the present specification, a terminal apparatus is simply referred to as a terminal) tend to have a reduced size and thickness. Thus, an antenna section mounted on the terminal is closer to a human body during a telephone call, so that concerns are rising that antenna radiation characteristics are degraded.

In recent years, instead of terminals which employ an accommodation/extension type of whip antenna provided externally to the terminal, terminals which employ a so-called built-in antenna provided inside the terminal have come on the market as an antenna having advantages such as a low probability of breakage resulting from a drop or the like or the ability to improve design of the portable wireless terminal. It goes without saying that degradation of characteristics caused by a human body is also a concern in the terminal employing the built-in antenna.

In addition, as a strong tendency in recent years, an increasing number of users use mobile phones not only for telephone calls by voice, but also for data communication such as electronic mails and connections to the Internet. In association therewith, terminals of a so-called clamshell type which is provided with a hinge in an intermediate section of the terminal have been on the market in increasing numbers due to the advantage that a liquid crystal display section can be increased in size. The clamshell type terminal generally has a receiver section and a liquid crystal display section provided in an upper housing unit and a keyboard section and a microphone section provided in a lower housing unit. In this case, a position where an antenna is provided is often (1) an upper portion of the upper housing or (2) an upper portion of the lower housing (that is, a hinge section). However, "provided in the upper portion of the upper housing" type generally must have a coaxial cable routed from a transmission/reception circuit (a wireless circuit) section provided within the lower housing to an antenna power supply section through the hinge section to cause the disadvantage that losses are produced corresponding thereto. In addition, since the upper housing unit tends to have a reduced thickness for design in recent years, there are disadvantages that the space for providing the antenna is not sufficient, the distance between the antenna and the head of a user is short to degrade antenna characteristics during a telephone call, and the like. Thus, the terminals employing "the hinge section provided" type antenna have grown in number.

In the hinge section provided type antenna, however, while the distance between the antenna and the head of a human body is long during a telephone call, a user often holds the lower housing or the boundary between the upper and lower housings (that is, near the hinge section) for the call, so that the antenna section is close to a hand or fingers of the user. In addition, since the keyboard section is generally provided in the lower housing unit as described above, the antenna section is also closer to the hand of the user when the user manipulates the keyboard. Furthermore, depending on preferences of a user, the hinge section provided type antenna has the disadvantage in terms of the antenna characteristics that, when the portion of the housing including the antenna projects, the user conveniently uses the terminal by putting his finger on the projected portion since his hand is stable.

On the other hand, the mobile phone generally has a speaker for generating ringtone on the back of a housing. Thus, when the terminal is placed on a desk or the like, the sound emitting port of the speaker faces the surface on which it is placed. It is thought that this is due to the issue of special allowance for disposing the speaker, no need to see the sound emitting port of the speaker in order to recognize sound such as ringtone, and the like.

FIG. 11 shows a side view of a conventional clamshell type of mobile phone having an upper housing and a lower housing connected through a hinge section. When the phone folded as shown is placed on a placing surface such as a desk, a speaker section abuts on or is close to the placing surface. In this case, there are problems that radiation of sound emitted from a sound emitting port is prevented and sound quality is degraded. Similarly, the speaker section abuts on or is close to the placing surface, so that a magnetic substance may be absorbed due to magnetism of the speaker, or dust or the like may enter a number of holes provided in the sound emitting port. This problem applies to a so-called stick type of mobile phone.

In a mobile phone in which a part of a housing is projected to accommodate an antenna section and the like, a speaker section may be lifted separately from a placing surface when the mobile phone is placed on a desk or the like. However, the size of open space formed between the housing and the placing surface for transmitting sound from the speaker is tilted in some directions, so that the problem occurs that sound is not necessarily radiated in the surroundings uniformly.

DISCLOSURE OF THE INVENTION

From the above, it is an object of the present invention to provide a portable wireless terminal having a hinge section provided type antenna suitable for a clamshell type which can maintain spacing from the head of a human body and alleviate the influence of the hand of a user.

It is a further object of the present invention to provide a portable communication terminal apparatus which has a speaker facing a placing surface and achieving not only prevention of degradation of sound quality but also extended radiation of sound into the surrounding space to transmit sound into the surroundings relatively uniformly.

The portable wireless terminal according to the present invention is characterized by a clamshell type portable wireless terminal having an upper housing and a lower housing connected to each other through a hinge, comprising a projection section projecting outward near a portion of the lower housing near a hinge section, and a built-in antenna housed in the projection section and having an antenna element in a linear or plate shape, wherein at least part of the antenna element on an open end side is disposed at a position which is unlikely to be covered by a hand or finger of a user when the user uses the terminal.

Since the portable wireless terminal has the built-in antenna housed in the projection section near the hinge section of the clamshell type portable wireless terminal, space for providing the antenna can be ensured. In addition, a relatively long distance between the antenna and the head is maintained during a telephone call. Furthermore, since a user often makes a call by holding a portion near the hinge section, the hand or finger of the user is closer to the antenna section in this structure. However, the antenna open end portion of the antenna element which is likely to be effected by a human body particularly is disposed at a position which is unlikely to be covered by the hand or finger of the user, thereby significantly reducing degradation of antenna characteristics when the terminal is used.

As one aspect, the antenna element is formed of a first element portion having a base end side connected to a feed point and a second element portion having a main surface forming a predetermined angle with a main surface of the first element portion. The second element portion is connected to a side portion on an end side of the first element portion and forms part of the open end side. Since the main surfaces of both element portions form the predetermined angle, the single antenna element has surfaces at different angles. This structure avoids a situation in which both main surfaces are simultaneously covered by the hand or finger of the user depending on how the user holds the housing.

As one aspect, the projection section has an outer surface extending in a housing width direction, the outer surface forming an acute angle with an outer main surface of the upper housing when the upper housing and the lower housing are opened. The antenna element is disposed such that the main surface of the second element portion extends along an inner wall surface of this outer surface. In this structure, the surface of the projection section forming the predetermined angle with the outer main surface of the opened upper housing can be effectively utilized as a position which is unlikely to be covered by the hand or finger of the user.

The portable wireless terminal according to the present invention is characterized by having a sound emitting port of a speaker generating ringtone on a back side of the lower housing, wherein, when the back side of the lower housing is placed on a placing surface in a plane shape, the sound emitting port of the speaker is lifted separately from the placing surface substantially uniformly at least on both sides of the lower housing by the projection section.

As one aspect, the portable wireless terminal according to the present invention is characterized by having a sound emitting port of a speaker generating ringtone on a back side of the lower housing, wherein, when the back side of the lower housing is placed on a placing surface in a plane shape by the projection section, the sound emitting port of the speaker is lifted separated from the placing surface, and space opened substantially uniformly at least on both sides of the lower housing is formed.

According to another standpoint, the portable wireless terminal according to the present invention is characterized by a clamshell type portable wireless terminal having an upper housing and a lower housing connected to each other through a hinge, comprising an antenna element having a first element portion in a flat plate shape having a base end side connected to a feed point and a second element portion in a flat plate shape connected to a side portion on the end side of the first element portion and having a main surface forming a predetermined angle with a main surface of the first element portion, the antenna element being disposed within the housing near a hinge section along a housing width direction. This structure serves to avoid a situation in which both main surfaces are simultaneously covered by the hand or finger of the user depending on how the user holds the housing since both element portions form the predetermined angle.

According to a further standpoint, the portable wireless terminal according to the present invention is characterized by a clamshell type portable wireless terminal having an upper housing and a lower housing connected to each other through a hinge, comprising, a built-in antenna disposed near a hinge portion along a housing width direction, the build-in antenna having an antenna element in a flat plate shape having a base end side connected to a feed point, in a state in which a hand or finger of a user is closest to an open end side of the antenna element from outside the housing in an open state, a main surface of the antenna element forming the right angle or an angle near the right angle with respect to a surface of the hand or finger at least over a predetermined length on the open end side. This structure serves to reduce the influence of the hand or finger of the user on the antenna at least on the open end side of the antenna element.

BRIEF DESCRIPTION OF THE DRAWINGS

FIG. 6C and FIG. 6D are diagrams for explaining the case where a finger other than the thumb (for example, a forefinger) is put on;

BEST MODE FOR CARRYING OUT THE INVENTION

Embodiments of the present invention are hereinafter described in detail with reference to the drawings.

Figure 1A:
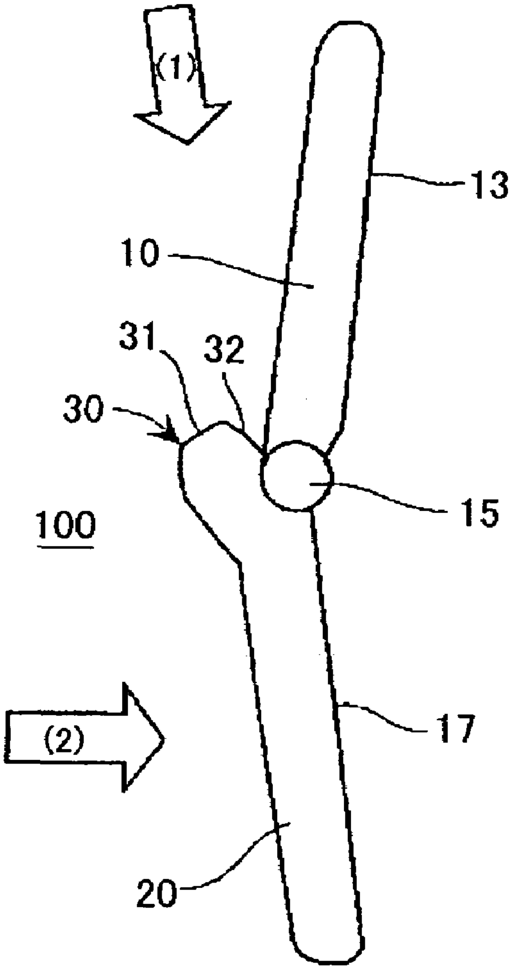
FIG. 1A and FIG. 1B are side views showing an opened state (FIG. 1A) and a closed (folded) state (FIG. 1B) of a clamshell type portable wireless terminal to which the present invention is applied.
Figure 1B:
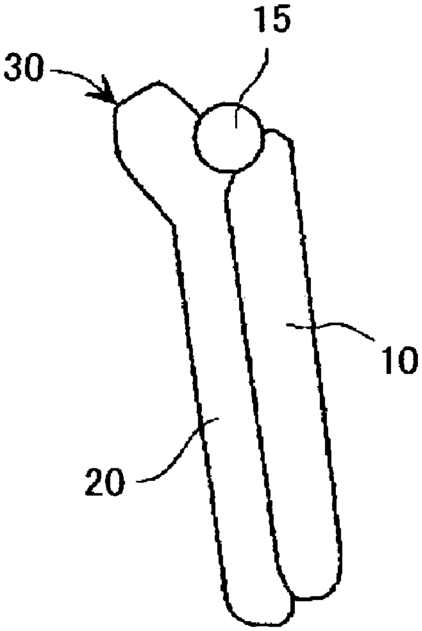

FIG. 1A and FIG. 1B are schematic side views of a clamshell type of portable wireless terminal 100 to which the present invention is applied. FIG. 1A shows the state in which the terminal is opened, while FIG. 1B shows a state in which the terminal is closed (folded). In the present embodiment, a mobile phone is shown as the portable wireless terminal, and in the following description, it is also referred to simply as a terminal. The terminal 100 comprises an upper housing 10 and a lower housing 20 bonded to be foldable through a hinge 15. A liquid crystal display section 13 is provided on a main surface on an inner side of the upper housing 10. A keyboard surface 17 is disposed on a main surface on an inner side of the lower housing 20. A projection section 30 which constitutes an antenna area projecting outward in an obliquely upward direction is formed near the hinge 15 of the lower housing 20. As described later, an antenna is disposed within the projection.

Figure 2B:
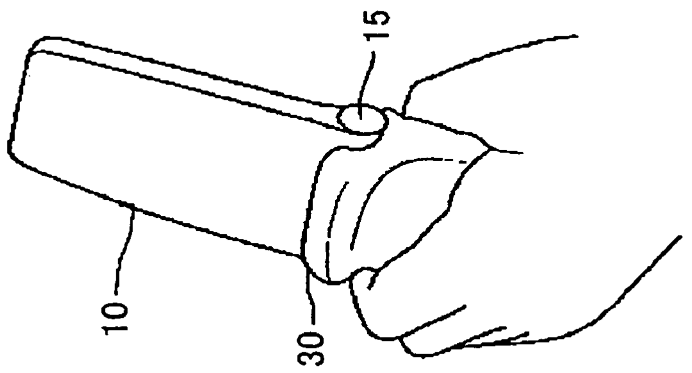
FIG. 2A and FIG. 2B are views showing the external appearance of the terminal when the terminal in the opened state shown in FIG. 1A is viewed from an outward upper direction (1) (FIG. 2A), and the external appearance of the terminal when the terminal in the same state is viewed from an outward side direction (2) (FIG. 2B)
Figure 2A:
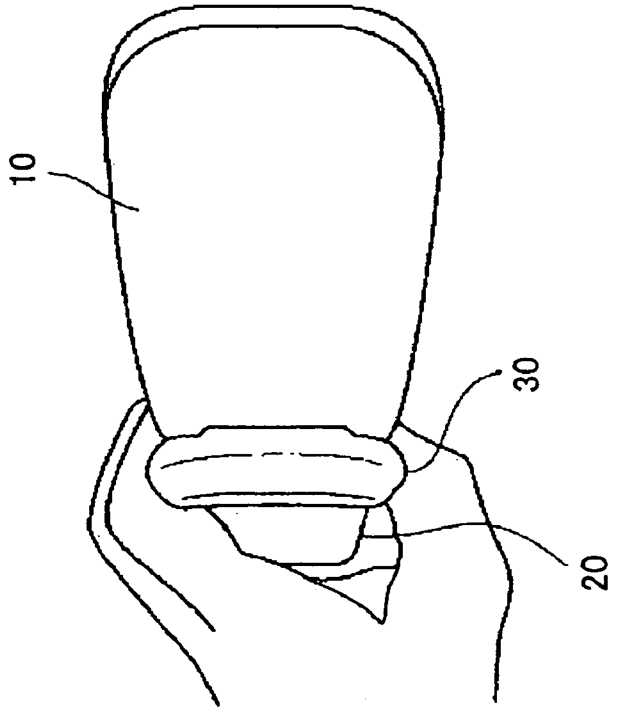

FIG. 2A shows the external appearance of the terminal when the terminal 100 in the opened state shown in FIG. 1A is viewed from an outward upper direction (1). FIG. 2B shows the external appearance of the terminal when the terminal 100 in the same state is viewed from an outward side direction (2). Both figures show the state in which the lower housing 20 is hold by a hand (a left hand) of a user. As seen from these figures, the projection section 30 is formed to extend in a width direction of the housing of the terminal 100.

Figure 3A:
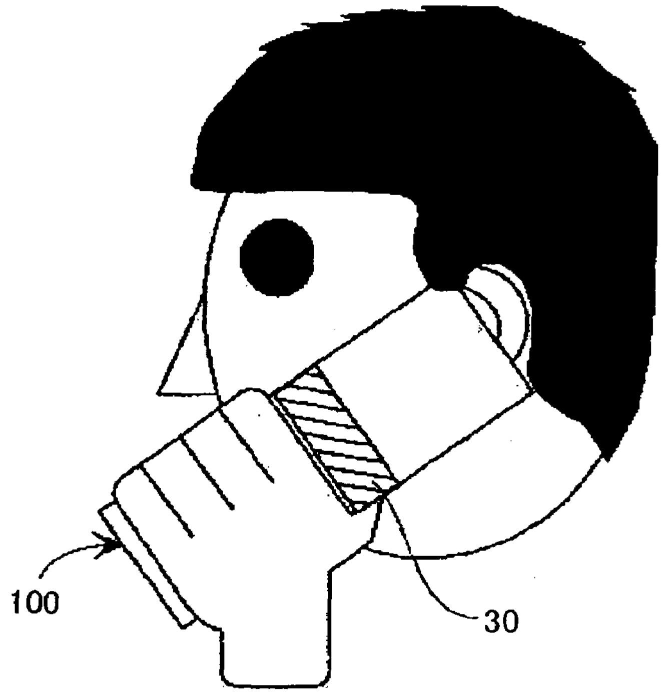
FIG. 3A and FIG. 3B are views for explaining the different manners of holding the portable terminal by a user when the terminal is used for a telephone call.
Figure 3B:
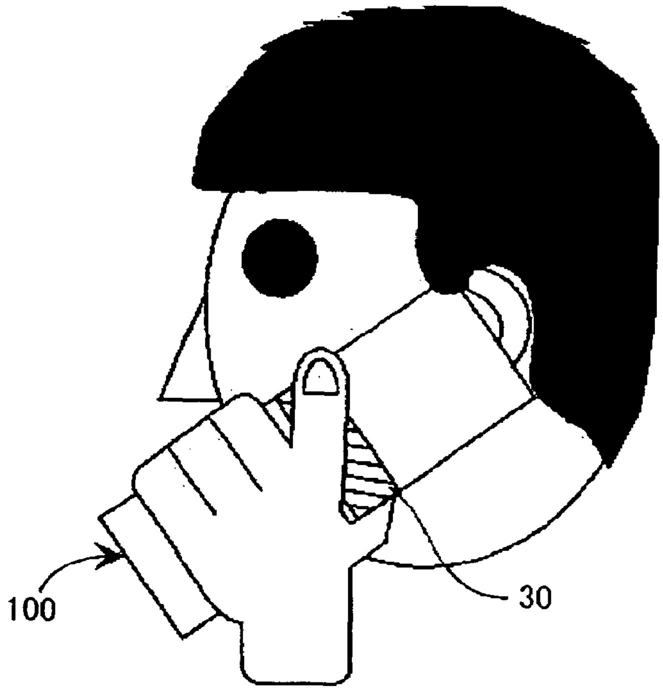
Figure 6A:
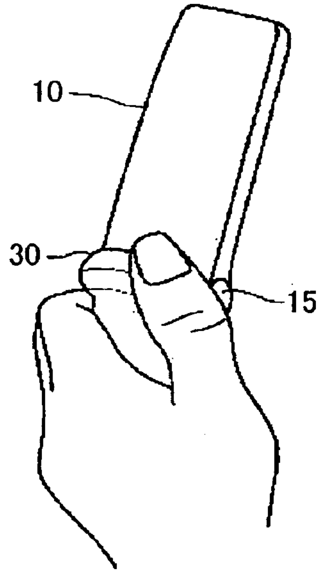
FIG. 6A and FIG. 6B are views for explaining the case where a thumb is put on a projection section.
Figure 6B:
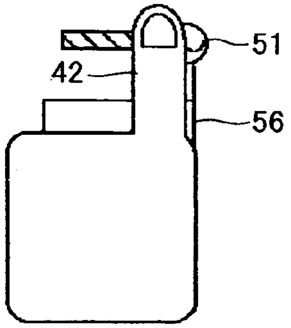
Figure 6C:
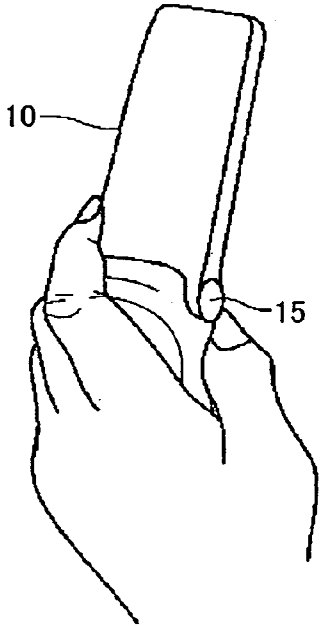
Figure 6D:
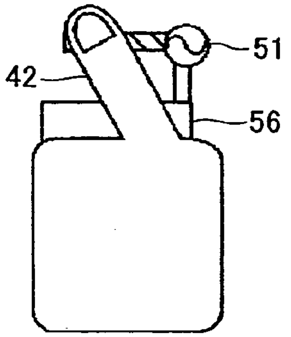

This clamshell type terminal has the structure in which fingers are easily put on the projection section (antenna area) 30 having the antenna provided therein. Thus, depending on users, use is often made during a telephone call by putting fingers on the projection section 30 as shown in FIG. 3B, not in the state in which the projection section 30 is exposed as shown in FIG. 2A and FIG. 2B or FIG. 3A. In this case, a thumb may be put on the projection section as shown in FIG. 6A and FIG. 6B, or a finger other than the thumb (for example, a forefinger) may be put as shown in FIG. 6C and FIG. 6D.

Figure 4A:
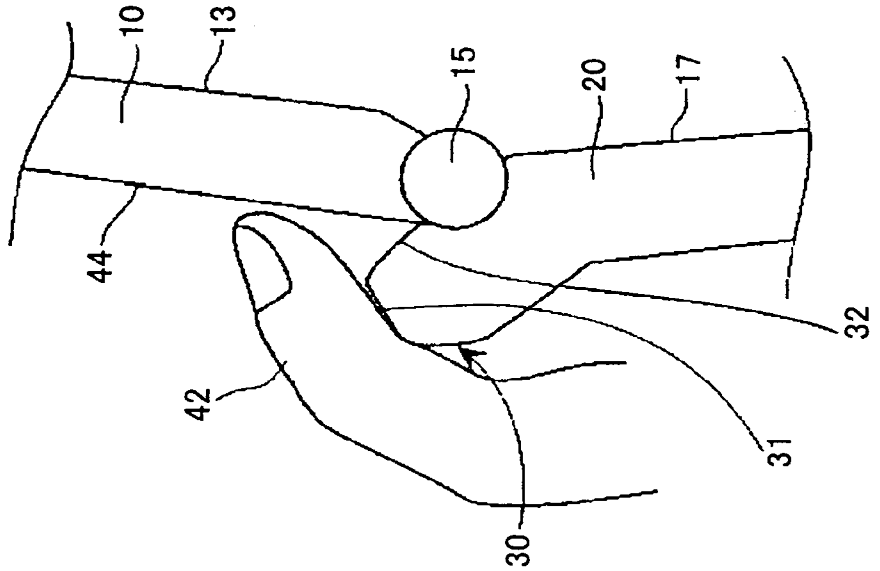
FIG. 4A and FIG. 4B are views for explaining the case where a finger is put on a projection section in an embodiment of the present invention.
Figure 4B:
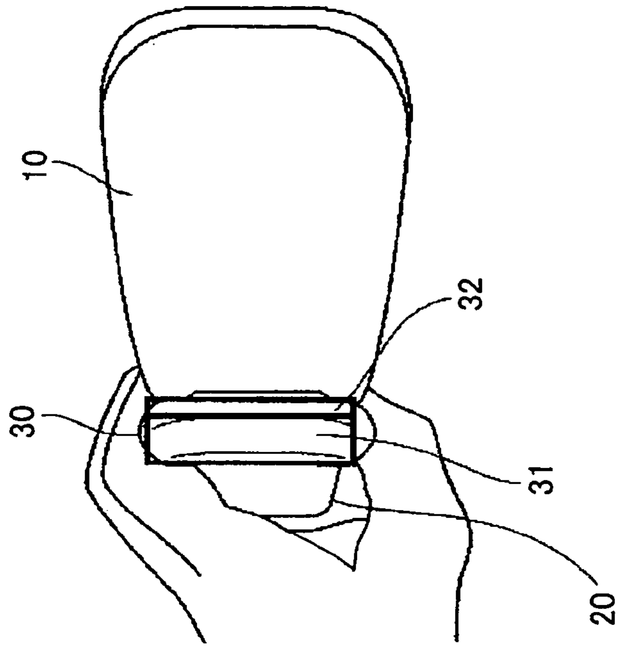

In either case, as shown in FIG. 4A, even when a finger 42 is put on the projection section 30, the projection section 30 has a surface (A) 31 on which the finger is likely to be put and a surface (B) 32 on which the finger is unlikely to be put in the state in which the terminal is opened. This is because the surface (B) 32 forms an acute angle with an outer main surface 44 of the upper housing 10 in the opened state in the example of the figure. In other words, the shape and arrangement of the projection section 30 is considered such that such an acute angle is formed. Here, "the finger put on" means that the finger is in contact with the surface of the housing over a large area or the finger is close thereto to a high degree (with a small distance). Whether or not the finger is likely to put on the portion of the housing relates to the size of the area of the surface of an antenna element covered by the finger depending on the structure and arrangement of the antenna element positioned inside. In the present specification, "unlikely to be covered" means that this area is reduced. While the outline shape of the projection section is shown as a polygonal line in the figures, the shape as shown is not necessarily used. FIG. 4B shows both of the surfaces 31 and 32 in the external appearance of an actual terminal.

Figure 5A:
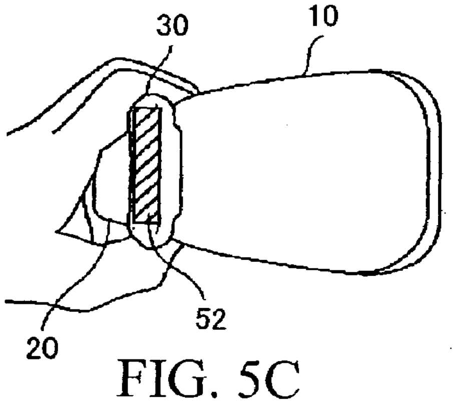
FIG. 5A and FIG. 5B are views for explaining a case where an open end has an escape from a finger and a case where it has no such an escape in the embodiment of the present invention.
Figure 5B:
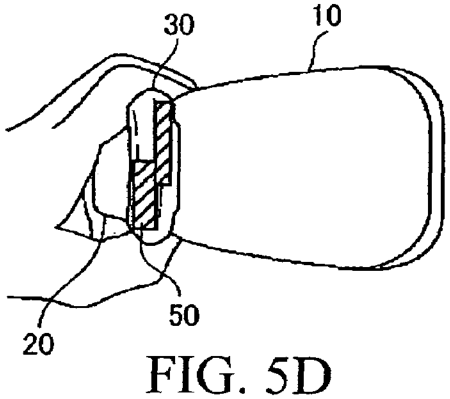

FIG. 5A shows an example of installation of an antenna element which is usually contemplated in this clamshell type terminal employing the built-in antenna provided in the hinge section. FIG. 5B shows an example of installation of an antenna element in an embodiment of the present invention. Both figures schematically show from the outside how the antenna elements are arranged within the projection sections 30 (shown in the state in which no fingers are put on the projection sections for good visibility).

Figure 5C:
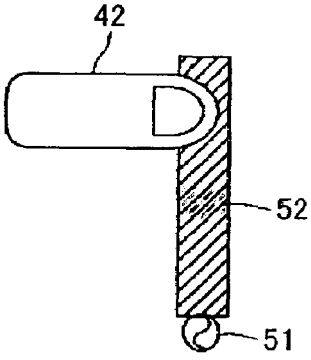
FIGS. 5C to 5F illustrate antenna apparatus of the wireless terminal.
Figure 5D:
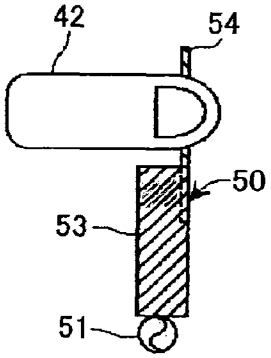
Figure 5E:
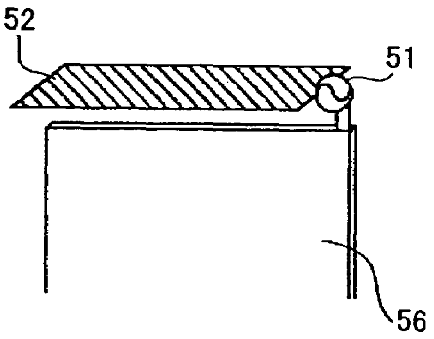

In the structure of FIG. 5A, as shown in FIG. 5E, an antenna element 52 in a linear or plate shape (thin plate shape) is disposed along the inner wall of the surface (A) 31 shown in FIG. 4A and FIG. 4B to separate the antenna element 52 from a ground 56 within the lower housing as much as possible. Depending on target free space radiation characteristics, bandwidth and the like of the antenna, it is thought that such placement is generally used in consideration of minimization of Q of the antenna to ensure (increase) the bandwidth. However, as shown in FIG. 4A, the hand or finger of a user is most likely put on the surface (A) 31. Thus, when the hand or the finger puts on the antenna section, the antenna surface is covered by the finger as shown in FIG. 5C, and it is thought that significant degradation of the antenna characteristics occurs.

To address this, the antenna apparatus of the present embodiment employs the structure and arrangement of the antenna element as shown in FIG. 5B and FIG. 5D. Specifically, an antenna element 50 is formed in a crank shape comprising an element portion 53 in a flat plane shape on the side of a feed point and an element portion 54 in a flat plate shape connecting to a side portion on the end side of the portion 53, and the angle between the element portion 54 and the element portion 53 is formed at a predetermined angle. The "predetermined angle" is substantially the right angle in this example, but it is not necessarily limited to the right angle. In the embodiment, both the element portions 53 and 54 are formed by folding the intermediate portion of a metal sheet in a crank shape (a conductive plate-shaped member) along the boundary between both portions. However, the present invention is not limited thereto, and separate elements 53 and 54 may be conductively bonded. Alternatively, they may be formed by metal foil, not by the metal sheet. In this example, the element portion 53 on the feed point side is disposed along the inner wall surface of the surface (A) 31 which is the upper surface of the projection section 30, and only the element portion 54 on the open end side is disposed along the inner wall surface of the surface (B) 32 on which the hand or finger of a user is hardly to be put. This is because, even in a single antenna element, a portion with a high impedance generally presents greater degradation of characteristics when the portion is covered by the hand or finger than a portion with a low impedance. Thus, the portion on the antenna open end which is a high impedance portion can be escaped from the hand or finger of the user. Here, "escape" means a state in which the degree that the surface of the antenna faces the hand or finger is reduced. The degree is smallest when the angle formed between the main surface of the antenna and the surface of the hand or finger is the right angle or an angle near the right angle, that is, in the state in which the hand or finger of the user is closest to the open end side of the antenna element from outside the housing in the opened state, when the main surface forms the right angle or an angle near the right angle with respect to the surface of the hand or finger at least over a predetermined length on the open end side of the antenna element.

In addition, according to this structure, the antenna element 50 is not arranged over the entire surface of the surface (B) 32 and is also arranged on the side of the surface (A) 31, so that a high Q of the antenna, that is, degradation of the antenna bandwidth can be prevented.

Figure 5F:
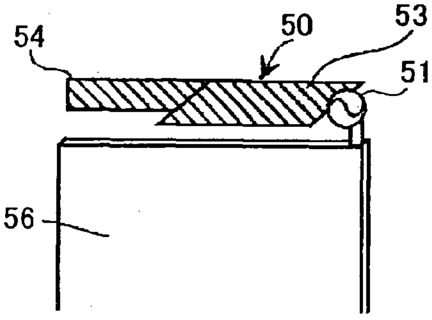
Figure 7:
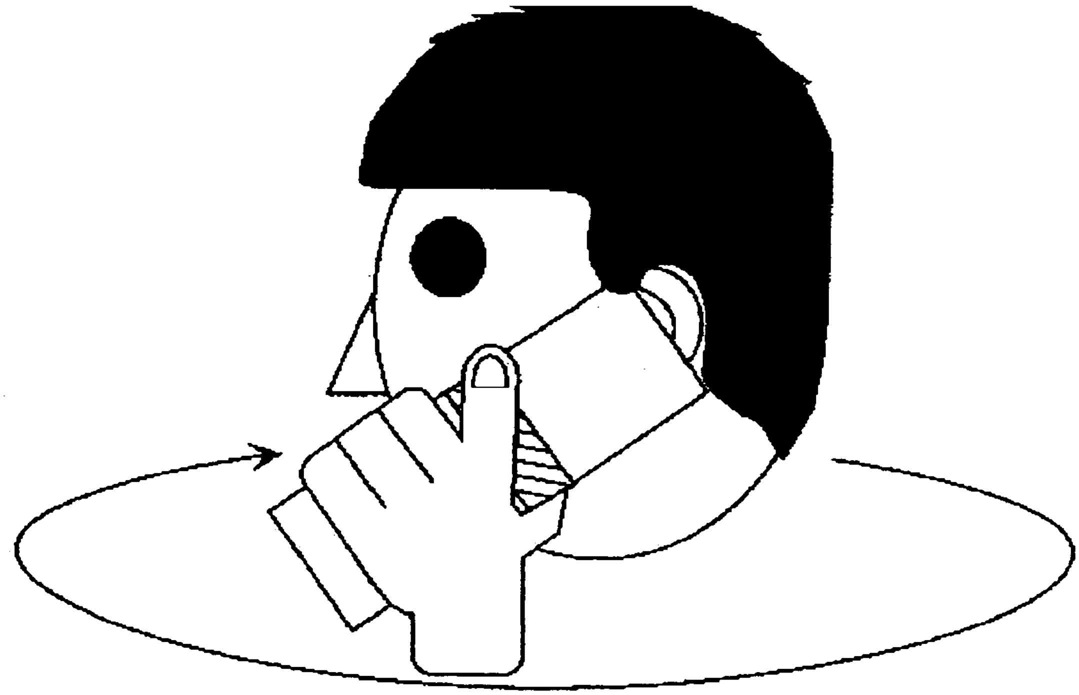
FIG. 7 is a view showing the outline of a measuring method for seeing antenna radiation characteristics when a finger of a user is put on an antenna section of the terminal in the embodiment of the present invention.

To demonstrate the effects of the present invention, the antenna radiation characteristics, PAG (Pattern Average Gain: pattern average gain of antenna horizontal plane radiation when the terminal is used) during a call by the terminal were measured and compared for the antenna shown in FIG. 5A, FIG. 5C, and FIG. 5E and the antenna shown in FIG. 5B, FIG. 5D, and FIG. 5F. The measurements were made at 8 points in 810 to 960 MHz assuming that a digital mobile telephone system in an 800 MHz band of Japan is used. As shown in FIG. 6A to FIG. 6D, measurements were made in two cases where a finger is put on the side of the antenna feed point (FIG. 6A and FIG. 6B) and where a finger is put on the side of the antenna open end (FIG. 6C and FIG. 6D). FIG. 7 shows the use state during a telephone call by the terminal and the measured plane in that case.

Figure 8A:
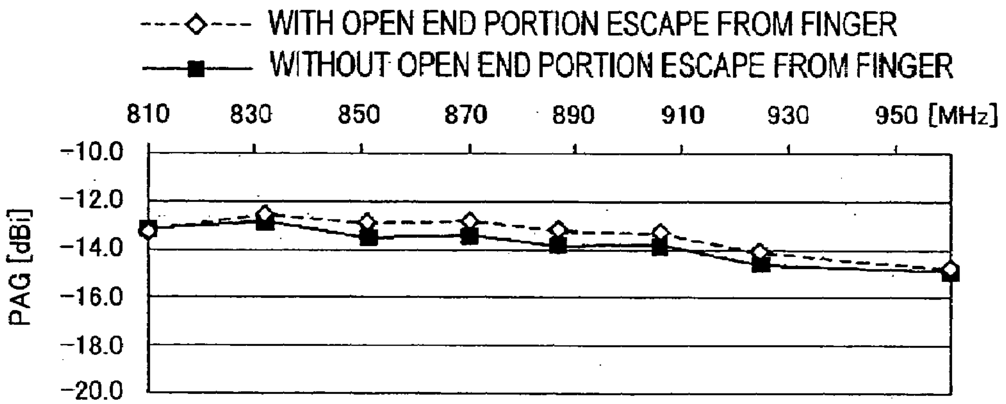
FIG. 8A and FIG. 8B show line graphs showing the antenna radiation characteristics based on the measurement in FIG. 7.
Figure 8B:
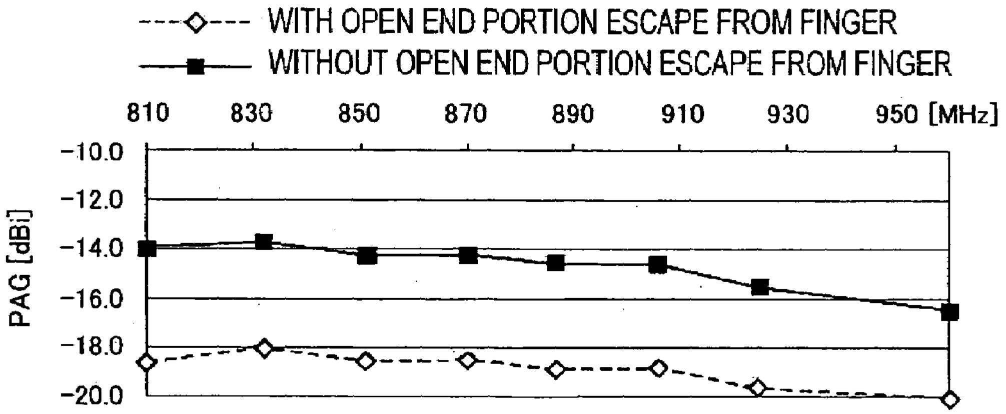
Figure 9:
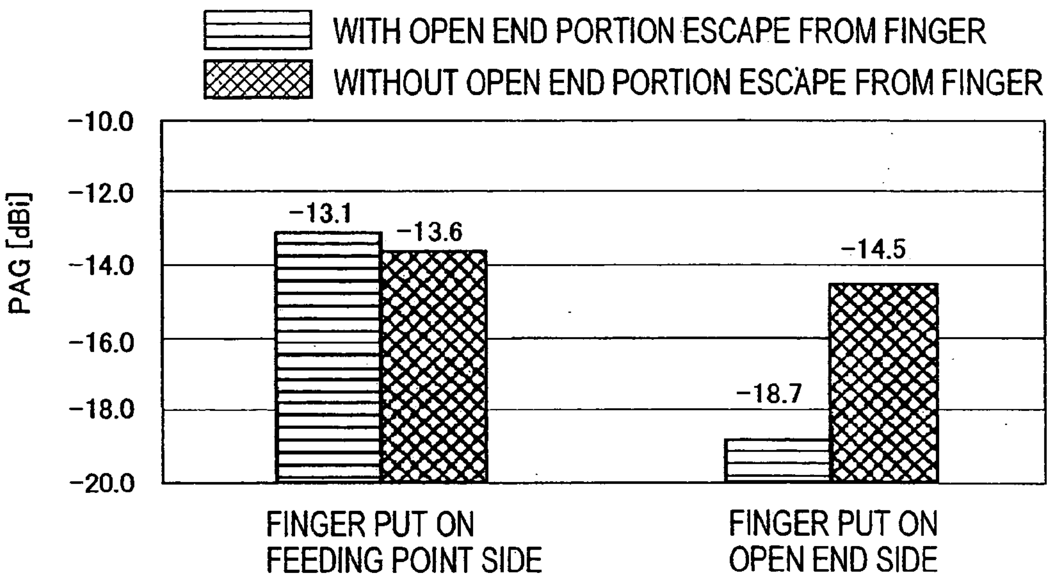
FIG. 9 shows a bar graph showing comparison results of PAG values averaged in a used frequency band.

FIGS. 8A and 8B, 9 show the results as graphs. FIG. 8A shows frequency characteristics of PAG when the finger is put on the side of the antenna feed point as a line graph, while FIG. 8B shows frequency characteristics of PAG when the finger is put on the side of the antenna open end as a line graph. FIG. 9 shows the comparison results of PAG values averaged in the used frequency band in both cases as a bar graph.

As seen from FIG. 8A, when the finger is put on the side of the antenna feed point, the structure in FIGS. 5A, 5C, and 5E has the substantially equal characteristics to the structure in FIGS. 5B, 5D, and 5F. However, as seen from FIGS. 8B and 9, the results when the finger is put on the side of the antenna open end has a difference of as much as 4 dB between both structures. In addition, the structure of the present embodiment in FIGS. 5B, 5D, and 5F shows degradation of only 1 dB as compared with when the finger is put on the side of the antenna feed point, while the structure in FIGS. 5A, 5C, and 5E shows significant degradation. From the facts, the significance of the influence when the finger is put on the side of the antenna open end can be seen.

In this manner, it can be seen that the escape structure of the antenna open end portion, which is the high impedance portion, from the hand or finger of the user can significantly reduce degradation of the antenna radiation characteristics when the finger is put on the portion where the antenna is provided.

While the aforementioned description has shown only the case where the user holds the portable wireless terminal with his left hand, equal effects can be also provided when it is held with his right hand. In addition, the escape structure of the antenna open end portion from the finger is not limited to one shown, and is applicable to portable wireless terminals in general in which an antenna portion is disposed at a position where a hand or finger of a user is likely to be put. While description has been made for the example in which no whip antenna is provided, the present invention is applicable to a terminal which uses both a whip antenna and a built-in antenna.

Next, description is made for an arrangement of a speaker facing a placing surface in detail.

Figure 10A:
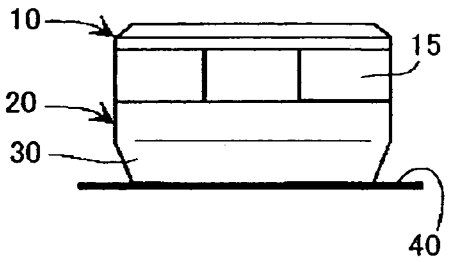
FIG. 10A is a front view showing the structure of a mobile phone according to a first embodiment of the present invention.
Figure 10B:
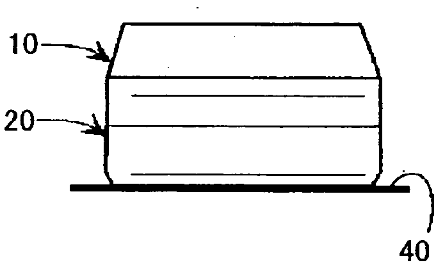
FIG. 10B is a rear view thereof.
Figure 10C:
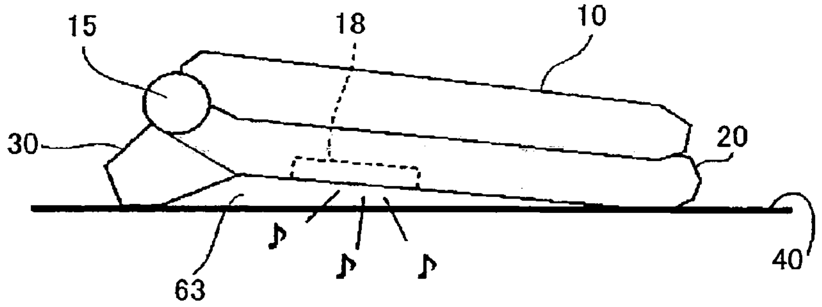
FIG. 10C is a side view thereof.
Figure 11:
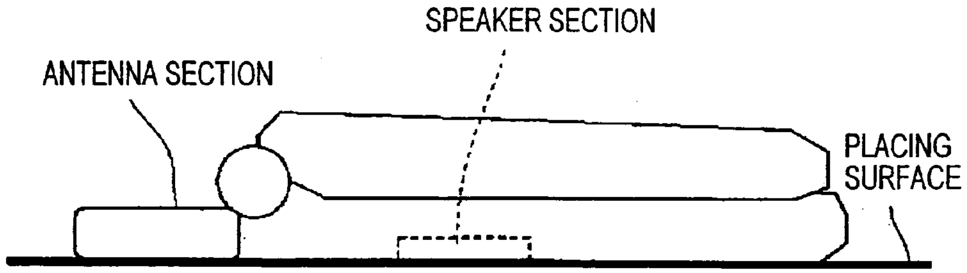
FIG. 11 is a side view showing a conventional clamshell type mobile phone having an upper housing and a lower housing connected through a hinge.

FIG. 10A to FIG. 10C show the structure of the mobile phone according to an embodiment of the present invention. FIG. 10A is a diagram showing the state in which the mobile phone is folded and placed on a placing surface 40 from the front. FIG. 10B is a diagram showing the state from the back. FIG. 10C is a diagram showing the state from the side. This is a clamshell type mobile phone and has the upper housing 10 and the lower housing 20 connected to be foldable through the hinge 15 as described above. In the present specification, "the view seen from the front" means a view seen from the side of the hinge 15. The mobile phone in the present embodiment has the projection section 30 on the front end of the lower housing 20, that is, on the side of the hinge 15, as described above. The projection section 30 extends in the width direction of the housing as apparent in FIG. 10A. The projection section 30 is in contact with the placing surface 40 linearly at its lower end. The rear end side of the lower housing 20 is also in contact with the placing surface 40 at its lower end linearly. Thus, the mobile phone is placed stably on the placing surface 40 in a plane shape. As seen from the side view of FIG. 10C, a space is formed between the lower housing 20 and the placing surface 40 in the state in which the mobile phone is placed on the placing surface 40. This space forms an opening section 63 which is laterally symmetric, that is, has the equal sizes and shapes on both side portions of the housing.

As a result, sound emitted from a speaker section 18 having a sound emitting port in the space section can be radiated uniformly to the left and right through the opening section 63 on both sides. While it cannot be said that the sound radiation is necessarily uniform in the left-to-right direction and the front-to-back direction, the structure can transmit sound into the surroundings more uniformly than conventional. In addition, since a predetermined interval is maintained between the sound emitting port of the speaker section 18 and the placing surface 40, absorption of a magnetic substance due to magnetism, entrance of dust or the like into a number of holes provided in the sound emitting port and the like are alleviated.

Figure 12A:
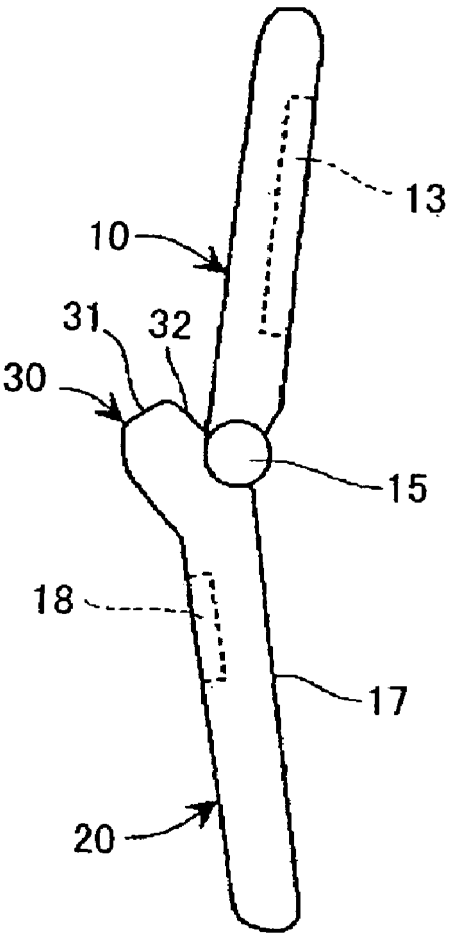
FIG. 12A and FIG. 12B are side views showing the clamshell type mobile phone shown in FIG. 10A to FIG. 10C when the terminal is opened and closed.
Figure 12B:
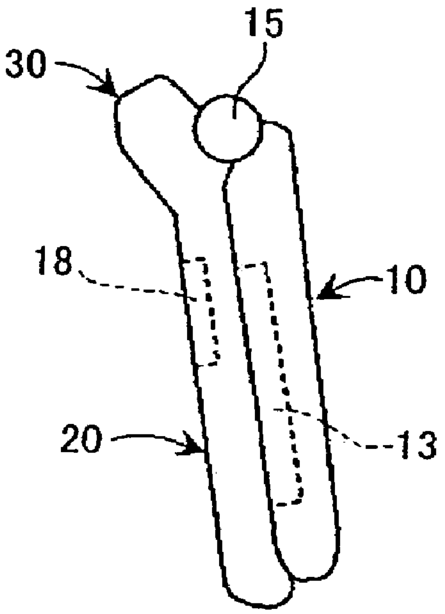

FIG. 12A and FIG. 12B are schematic side vies of the clamshell type mobile phone shown in FIG. 10A to FIG. 10C. FIG. 12A shows the state in which the upper housing is opened. FIG. 12B shows the state in which it is closed (folded). The liquid crystal display section 13 is provided on the main surface on the inner side of the upper housing 10. The keyboard surface 17 is disposed on the main surface on the inner side of the lower housing 20. The antenna is disposed within the projection 30 which projects outward in an obliquely upward direction near the hinge 15 of the lower housing 20 as described above.

Figure 13A:
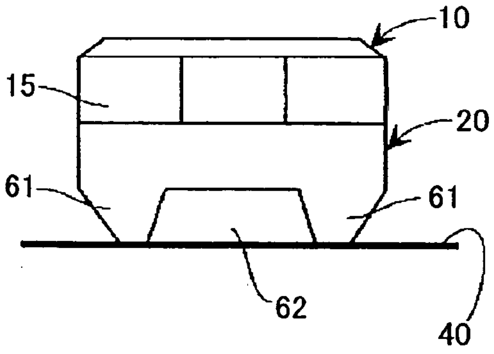
FIG. 13A is a front view showing the structure of a mobile phone according to a second embodiment of the present invention.
Figure 13B:
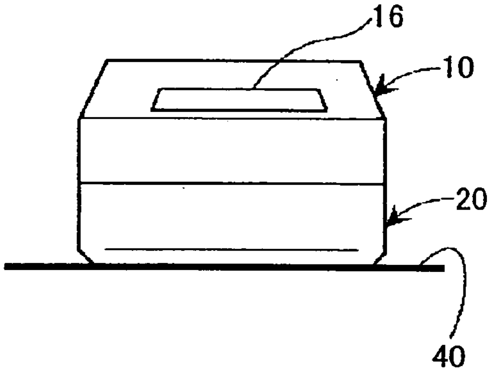
FIG. 13B is a rear view thereof.
Figure 13C:
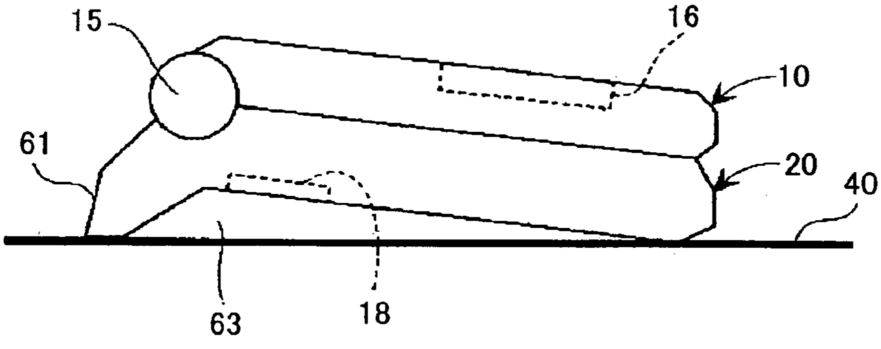
FIG. 13C is a side view thereof.

FIG. 13A to FIG. 13C show the structure of a mobile phone according to a second embodiment of the present invention. While this is similar to the mobile phone of the first embodiment except for the following point. Specifically, projection sections 61 at an end of a lower housing 20 on the side of a hinge have two separate parts and an opening section 62 is formed between them on a placing surface 40. While the projection section 30 of the first embodiment is in contact with the placing surface 40 linearly, each of the projections 61 of the present embodiments in contact with the placing surface 40, so to speak, in a point form. The end portion on the opposite side to the hinge section of the lower housing 20 is in direct contact with the placing surface without projection. An opening section 63 symmetric on both sides is formed identically to the first embodiment. An element 16 such as a sub display section or an incoming LED is disposed on the main surface on the outer side of the upper housing 10 as an example. However, this element 16 is not essential in the present invention. This also applies to the other embodiments. For an antenna in this embodiment, since the projection section is separated in two parts unlike the first embodiment, an antenna member, for example a helical antenna, can be fixedly disposed in at least one of them. This allows effective use of the space occupied by the projection section. Each antenna as described in the first or second embodiment can be also housed or disposed in a projection section depending on the form of the projection section in the following embodiments.

Since the space below a speaker section 18 is released (opened) in three directions of the front, left, and right in this embodiment, sound can be transmitted in the surroundings more uniformly as compared with the first embodiment.

Figure 14A:
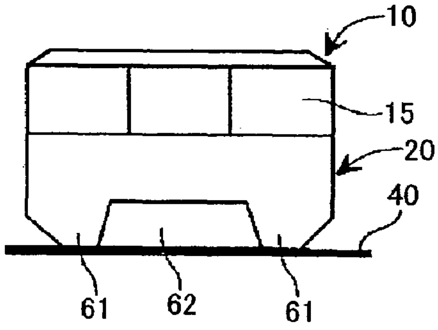
FIG. 14A is a front view showing the structure of a mobile phone according to a third embodiment of the present invention.
Figure 14B:
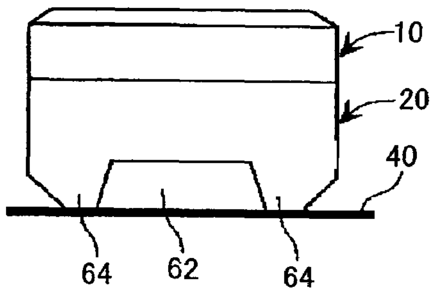
FIG. 14B is a rear view thereof.
Figure 14C:
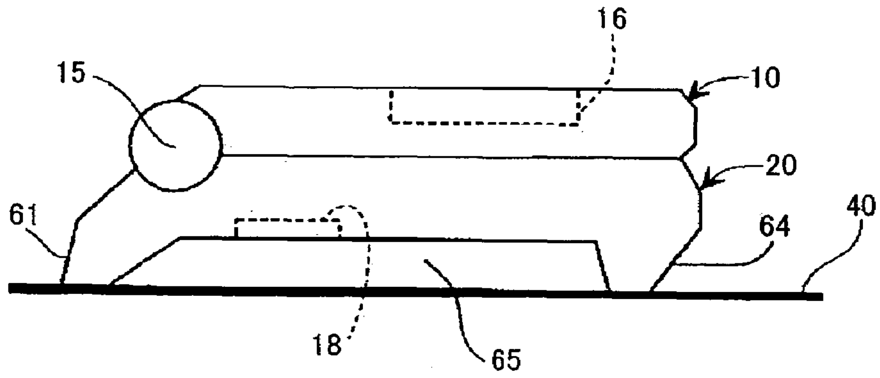
FIG. 14C is a side view thereof.

FIGS. 14A to 14C shows the structure of a mobile phone according to a third embodiment of the present invention. While this is similar to the mobile phone of the second embodiment except for the following point. Specifically, projection sections 64 in two separate parts are also provided at an end portion on the opposite side to an end portion on the side of a hinge of a lower housing 20. This forms an opening section 65 symmetric on both sides on a placing section 40 and forms an opening 62 which is substantially symmetric in the front-to-back direction. Since the space below a speaker section 18 is released in fourth directions of the front, back, left, and right in this embodiment, sound can be transmitted in the surroundings more uniformly as compared with the second embodiment.

Figure 15A:
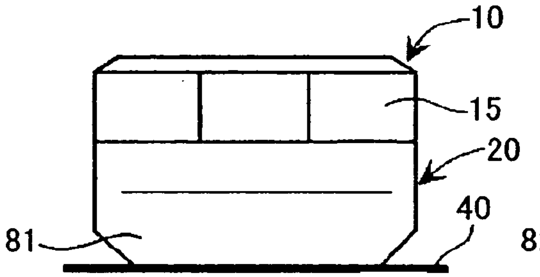
FIG. 15A is a front view showing the structure of a mobile phone according to a fourth embodiment of the present invention.
Figure 15B:
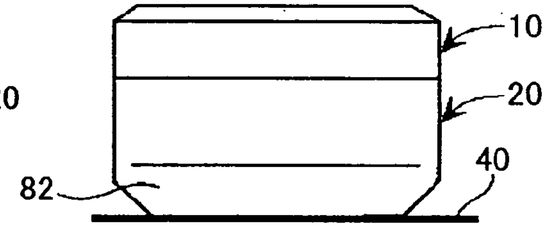
FIG. 15B is a rear view thereof.
Figure 15C:
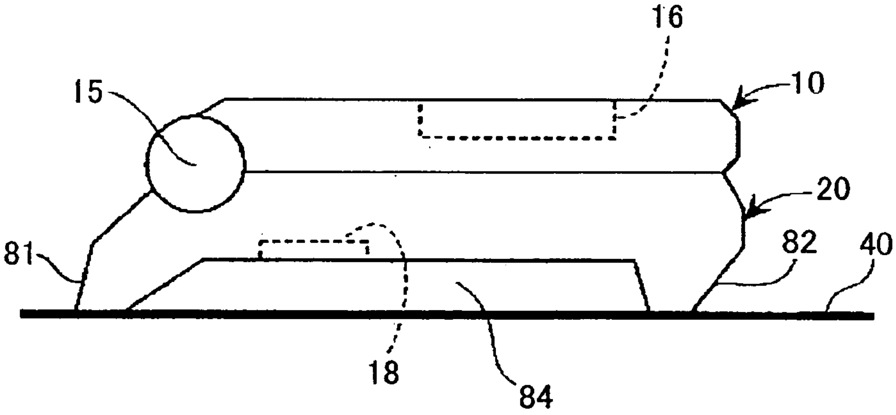
FIG. 15C is a side view thereof.

FIG. 15A to FIG. 15C shows the structure of a mobile phone according to a fourth embodiment of the present invention. While this is similar to the mobile phone of the third embodiment except for the following point. Specifically, projection sections 81 and 82 are provided to extend in the width direction at both end portions on the side of a hinge and the opposite side of a lower housing 20. This forms an opening section 84 symmetric on both sides on a placing section 40. Since the space below a speaker section 18 is released in two directions of the left and right in this embodiment, sound can be transmitted in the surroundings more uniformly than the conventional one.

Figure 16A:
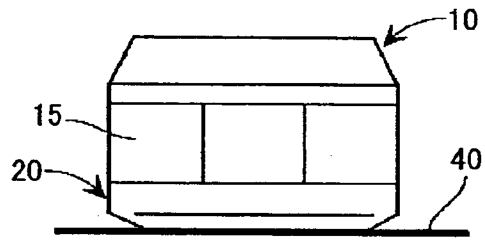
FIG. 16A is a front view showing the structure of a mobile phone according to a fifth embodiment of the present invention.
Figure 16B:
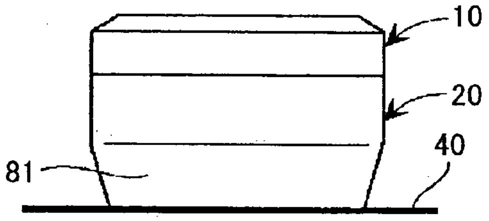
FIG. 16B is a rear view thereof.
Figure 16C:
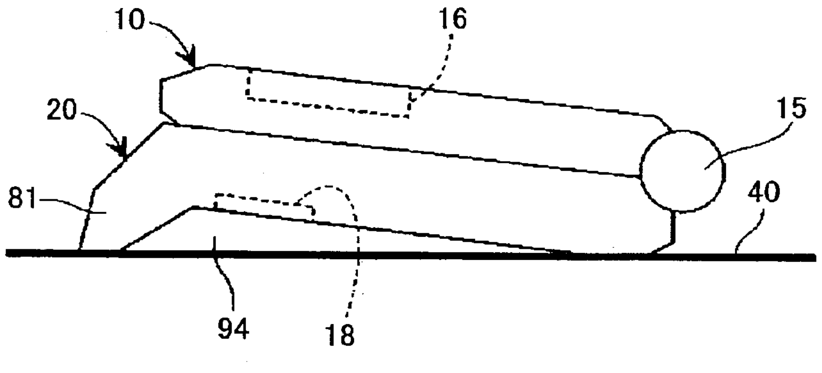
FIG. 16C is a side view thereof.

FIG. 16A to FIG. 16C shows the structure of a mobile phone according to a fifth embodiment of the present invention. While this is similar to the mobile phone of the first embodiment except for the following point. Specifically, a projection section 81 is provided to extend in the width direction at an end portion on the opposite side to an end portion on the side of a hinge of a lower housing 20. The end portion on the side of the hinge section of the lower housing 20 is in direct contact with a placing surface without projection. This forms an opening section 94 symmetric on both sides on a placing section 40. Since the space below a speaker section 18 is released in two directions of the left and right in this embodiment, sound can be transmitted in the surroundings more uniformly than the conventional one.

Figure 17A:
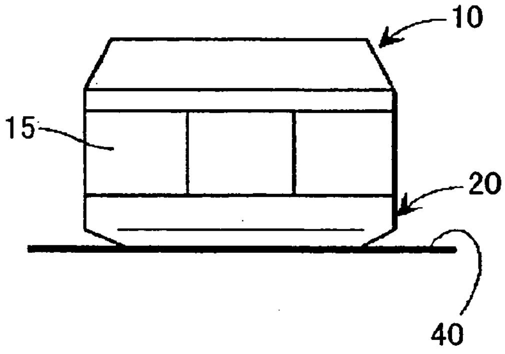
FIG. 17A is a front view showing the structure of a mobile phone according to a sixth embodiment of the present invention.
Figure 17B:
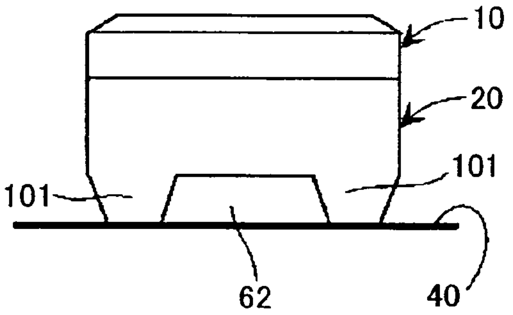
FIG. 17B is a rear view thereof.
Figure 17C:
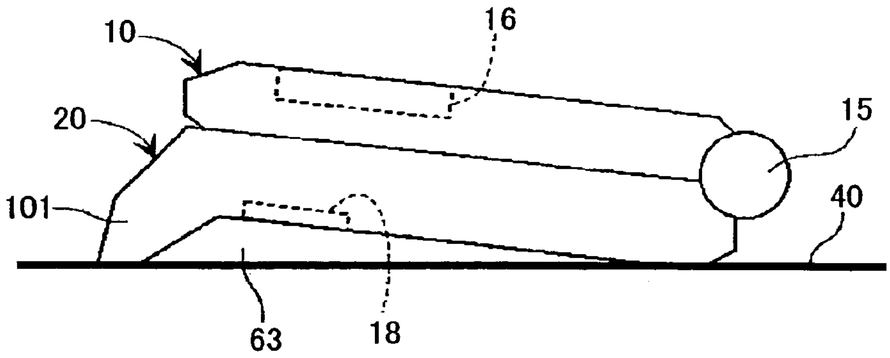
FIG. 17C is a side view thereof.

FIG. 17A to FIG. 17C shows the structure of a mobile phone according to a sixth embodiment of the present invention. While this is similar to the mobile phone of the fifth embodiment except for the following point. Specifically, projection sections 101 in two separate parts are provided at an end portion on the opposite side to an end portion on the side of a hinge of a lower housing 20. The end portion on the side of the hinge section of the lower housing 20 is in direct contact with a placing surface without projection. This forms an opening section 63 symmetric on both sides and forms an opening section 62 on the rear side on a placing section 40. Since the space below a speaker section 18 is released in three directions of the left and right in this embodiment, sound can be transmitted in the surroundings more uniformly as compared with the fifth embodiment.

Figure 18A:
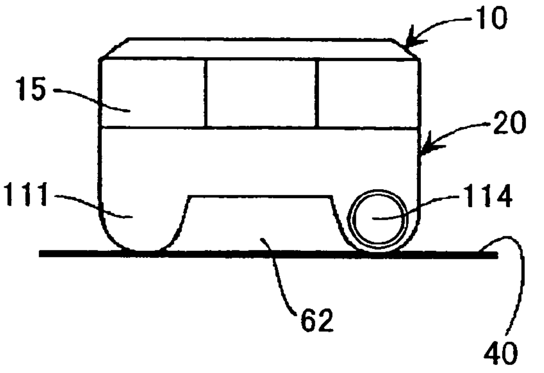
FIG. 18A is a front view showing the structure of a mobile phone according to a seventh embodiment of the present invention.
Figure 18B:
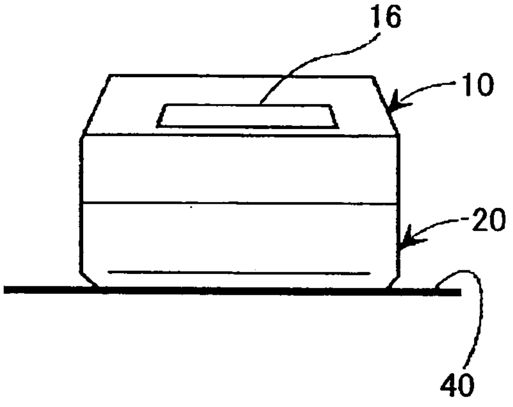
FIG. 18B is a rear view thereof.
Figure 18C:
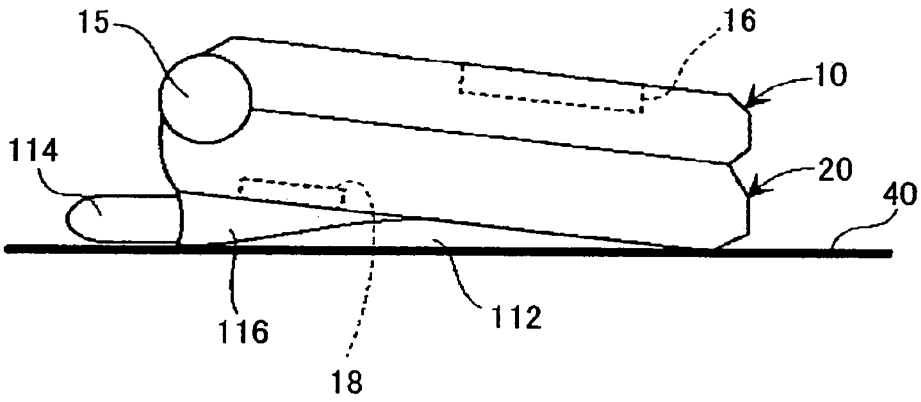
FIG. 18C is a side view thereof.

FIG. 18A to FIG. 18C shows the structure of a mobile phone according to a seventh embodiment of the present invention. This is a mobile phone which has a projection section 116 accommodating a whip antenna 114 and has a projection section 111 with the equal size to this projection on the side portion on the opposite side. The projection section 111 has no antenna accommodated therein. The antenna 114 may be a fixed antenna which cannot be extended. This structure allow the mobile phone to be stably placed on a placing surface and forms opening sections 112 symmetric on both sides and an opening section 62 in front in which the space facing a speaker section 18 connects to the surroundings. In other words, the space facing the speaker section 18 is released in three directions of the opening section 62 and the two opening sections 112. Thus, sound can be transmitted in the surroundings more uniformly than the conventional one.

Figure 19B:
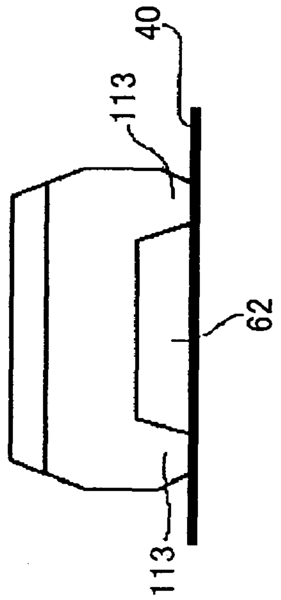
FIG. 19B is a rear view thereof.
Figure 19A:
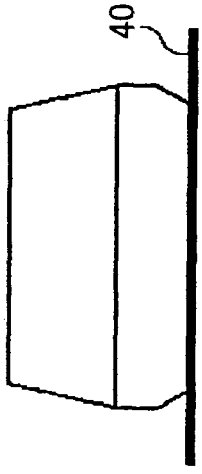
FIG. 19A is a front view showing the structure of a mobile phone according to an eighth embodiment of the present invention.
Figure 19C:
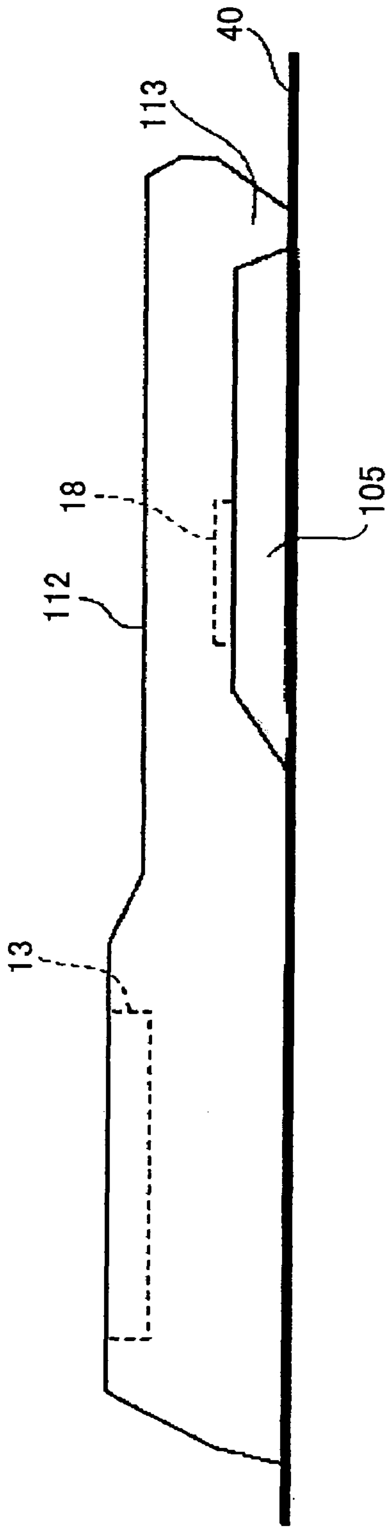
FIG. 19C is a side view thereof.

FIG. 19A to FIG. 19C shows the structure of a mobile phone according to an eighth embodiment of the present invention. This is not a clamshell type but a straight type mobile phone. Projection sections 113 in separate two parts are provided on the rear side of a housing, that is, on the opposite side to the side where a liquid crystal display section 13 is positioned. The projection sections 113 form an opening section 62 opened to the rear side and opening sections 105 opened symmetrically on both sides on a placing surface 40. In other words, the space facing a speaker section 18 is released in three directions of the opening section 62 and the two opening sections 105. Thus, sound can be transmitted in the surroundings more uniformly than the conventional one. In this embodiment, the projection section 113 may be formed to extend in the width direction of the housing.

While preferred embodiments of the present invention have been described, various modifications and variations are possible other than those referred to in the above description without departing from technical idea.

According to the present invention, since the built-in antenna is disposed in the projection section of the housing near the hinge section of the clamshell type mobile phone, the advantages of the hinge section provided type antenna are maintained such as a relatively large interval between the built-in antenna and the head of a user during use for a telephone call. Also, the surface of the projection surface forming a predetermined angle with the main surface on the outer side of the upper housing in the opened state is effectively used for arranging at least the open end side of the antenna element, it is possible to alleviate degradation of antenna characteristics which is a disadvantage of the hinge section provided type antenna due to the antenna section approaching a hand or finger of a user.

In addition, the antenna element is formed of the first element portion in a flat plane shape with its base end connected to the feed point and the second element portion in a flat plate shape connecting to the side portion on the end side of the element portion and having a main surface forming a predetermined angle with a main surface of the first element portion. Thus, in consideration of the free space radiation characteristics, a higher Q of the antenna, that is, degradation of the antenna bandwidth can be alleviated.

Furthermore, according to the portable terminal apparatus of the present invention, the presence of the predetermined projection section allows the apparatus to be placed stably on the placing surface, and the speaker facing the placing surface achieves not only prevention of degradation of sound quality but also extended radiation of sound into the surrounding space to transmit sound into the surroundings relatively uniformly.

What is claimed is:

1. A clamshell type portable wireless terminal having an upper housing and a lower housing connected to each other through a hinge, comprising:

a projection section projecting outward near a hinge section of said lower housing; and a built-in antenna housed in said projection section and having an antenna element in a linear or plate shape, said antenna element being formed of a first element portion having a base end side connected to a feed point and a second element portion having a main surface forming a predetermined angle with a main surface of the first element portion, wherein at least a part of said antenna element on an open end side is disposed at a position which is hardly to be covered by a hand or finger of a user when the user uses the terminal, and wherein said second element portion is connected to a side portion on an end side of said first element portion and forms a part of said open end side.

2. The portable wireless terminal according to claim 1, wherein said antenna element is formed by folding an intermediate portion of a conductive plate-shaped member substantially in a crank shape.

3. The portable wireless terminal according to claim 1, wherein said projection section has an outer surface extending in a housing width direction, said outer surface forming an acute angle with an outer main surface of said upper housing when said upper housing and said lower housing are opened, and said antenna element is disposed such that the main surface of said second element portion extends along an inner wall surface of said outer surface.

* * * * *

UNITED STATES PATENT AND TRADEMARK OFFICE

CERTIFICATE OF CORRECTION

PATENT NO. : 7,266,399 B2
APPLICATION NO. : 11/441640
DATED : September 4, 2007
INVENTOR(S) : Masatoshi Sawamura It is certified that error appears in the above-identified patent and that said Letters Patent is hereby corrected as shown below:

Title Page,

Item (73) Assignee:

Change "Sony Erisson Mobile Communication Japan, Inc" to

-- Sony Erisson Mobile Communications Japan, Inc--.

Signed and Sealed this

Twentieth Day of November, 2007

JON W. DUDAS

*Director of the United States Patent and Trademark Office*

UNITED STATES PATENT AND TRADEMARK OFFICE

CERTIFICATE OF CORRECTION

PATENT NO. : 7,266,399 B2
APPLICATION NO. : 11/441640
DATED : September 4, 2007
INVENTOR(S) : Masatoshi Sawamura It is certified that error appears in the above-identified patent and that said Letters Patent is hereby corrected as shown below:

<u>Title Page,</u>

Item (73) Assignee:

Change "Sony Erisson Mobile Communication Japan, Inc" to

-- Sony Ericsson Mobile Communications Japan, Inc --.

Signed and Sealed this

First Day of April, 2008

JON W. DUDAS
*Director of the United States Patent and Trademark Office*